Oct. 7, 1947.  M. E. McCLELLAN ET AL  2,428,672
PLUNGER FOR BALING PRESSES
Filed July 12, 1945   2 Sheets-Sheet 1
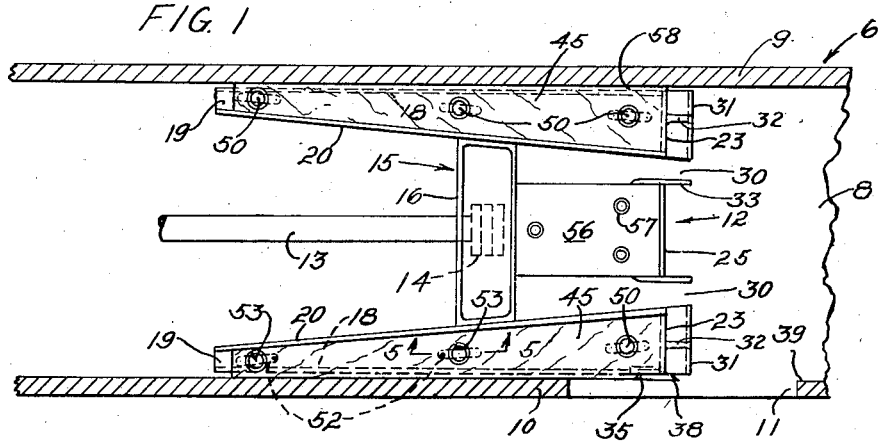
FIG. 1
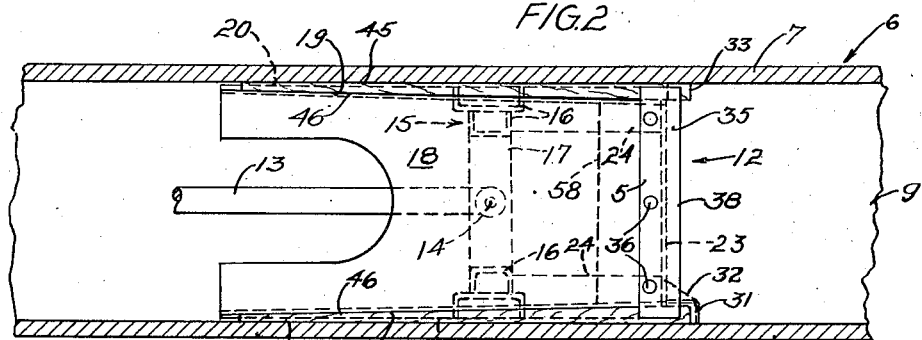
FIG. 2
FIG. 4
FIG. 3
FIG. 5
INVENTORS
M. E. McCLELLAN + J. R. WEST

INVENTORS:
M. E. MCCLELLAN & J. R. WEST
ATTORNEYS

Patented Oct. 7, 1947

2,428,672

UNITED STATES PATENT OFFICE 2,428,672

PLUNGER FOR BALING PRESSES

Marcus E. McClellan and James Rex West, Ottumwa, Iowa, assignors to Dain Manufacturing Co. of Iowa, Ottumwa, Iowa, a corporation of Iowa Application July 12, 1945, Serial No. 604,674

4 Claims. (Cl. 100—29)

1

The present invention relates generally to baling presses and more particularly to baling presses for agricultural use in baling hay, straw and other crop material, and has for its principal object the provision of a novel and improved plunger for presses of this general type.

A more specific object relates to the provision of a plunger head for reciprocative movement within a bale case, and provided with means for adjusting the play between the plunger head and the bale case to compensate for wear.

These and other objects and advantages of our invention will be apparent to those skilled in the art after a consideration of the following description, in which reference is had to the drawings appended hereto, in which Figure 1 is a top plan view, taken in section through a bale case, showing a plunger head embodying the principles of our invention;

Figure 2 is a side elevational view, taken in section through the bale case and showing the plunger head in side elevation;

Figure 3 is a front elevational view, taken in section through the bale case, showing the working end of the plunger head;

Figure 4 is a fragmentary horizontal sectional view, taken along a line 4—4 in Figure 3 and drawn to an enlarged scale;

Figure 5 is a fragmentary vertical sectional view, taken along a line 5—5 in Figure 1 and drawn to an enlarged scale.

Figure 6:
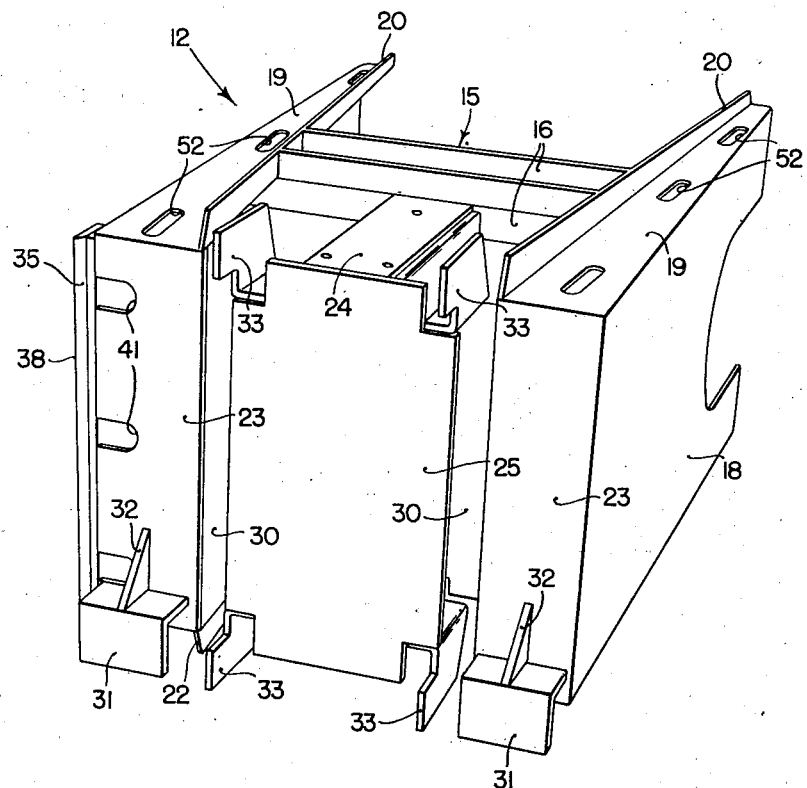
Figure 6 is a perspective view of the plunger head with the wooden members removed.

Referring now to the drawings, the bale case 6 comprises a rectangular wall structure, having substantially parallel horizontal top and bottom walls 7, 8, and a pair of laterally spaced vertical walls 9, 10 approximately perpendicular to the top and bottom walls 7, 8. One of the side walls 10 is provided with a feed opening 11, through which the crop material is fed into the bale case 6. The crop material in the bale case is compressed into a bale by means of a plunger comprising a plunger head 12 actuated by a suitable connecting rod 13 pivotally connected thereto at 14. The plunger head 12 comprises a structural frame 15, which includes transversely extending channel sections 16 interconnected by vertical members 17 and a pair of laterally spaced side plates 18, the upper edges of which are turned inwardly to form top walls 19, the inner edges of which are turned upwardly to form flanges 20, which are spaced laterally outwardly from the center of the plunger head. Similarly, the lower edges of the side walls 18 are turned inwardly to

2 provide bottom walls 21, the inner edges of which are turned downwardly to provide laterally spaced flanges 22. Front wall plates 23 are supported between the top and bottom walls 19, 21 and along the forward edges of the side walls 18, the plates 23 extending inwardly to the inner sides of the vertical flanges 20, 22.

A central head portion includes forwardly extending channel frame members 24 spaced vertically and connected with the transverse channel members 16, as by welding. A front wall 25 is secured to the central frame portions 24 and is substantially in transverse alignment with the front walls 23, forming the working face of the plunger head 12.

It is now evident that the plunger head frame 15 is generally rectangular and is provided with a pair of vertically extending laterally spaced slots 30, defined by the adjacent edges of the central and outer front walls 25, 23. The slots extend rearwardly to the transverse channel frame members 16 and serve as passageways for the two needles of a wire tying mechanism, described in a co-pending Tuft application, Serial No. 594,684, filed May 19, 1945.

A pair of transversely extending structural angle members 31 are rigidly fixed, as by welding, to the front walls 23 near their lower ends, with the horizontal flanges of the angle members extending forwardly therefrom, braced by gussets 32, and the vertical flanges extending downwardly above the floor plate 8 of the bale case. These angle members 31 compress the hay or other crop near the bottom of the bale case slightly in advance of the main working face 23 of the plunger to permit the needles to begin moving upwardly through the bale case and through the slots 30 slightly before the plunger reaches its extreme position in the bale case, as explained in the Tuft application. Two pairs of vertical ears 33 project forwardly from the top and bottom of the central front wall 25 to serve as guides or shields for the needles.

A vertical knife 35 is disposed along the forward edge of the side wall 18 adjacent the feed opening 11 and is secured by a plurality of countersunk bolts 36 to a reenforcing plate 37, welded to the forward edge of the side wall 18 and to the outer edge of the front plate 23. The knife 35 has a cutting edge 38 along the forward edge thereof, which cooperates with a vertical edge 39 along the side of the feed opening 11, for chopping off each charge of hay as the plunger reciprocates. The bolts 36 are secured by nuts 40, which are accessible from the front of the plunger through apertures 41 in the front wall 23.

Each of the longitudinally extending corners of the metal frame is provided with a longitudinally extending wooden guide member 45, the outer side edges of which bear against the vertical side walls 9, 10 of the bale case, and the horizontal outer surfaces of which bear against the top and bottom walls 7, 8 of the bale case, respectively. These guide members 45 serve as bearing supports for the plunger head within the bale case and maintain the head in proper alignment within the case. The guides are made of hard wood, which has a minimum wearing effect against the inner surfaces of the bale case wall, but which has a satisfactory wearing life when properly lubricated.

A certain amount of wear on the guide members 45, is naturally to be expected, and it is in connection with the compensation for such wear that the present invention was conceived.

Each of the guide members 45 is tapered to provide rearwardly converging top and bottom sides and also rearwardly converging lateral sides. As best shown in Figure 2, the top surface of the upper guide members 45 lies flat against the top wall 7 of the bale case and the lower sides of the lower guide members lie flat against the bottom floor 8 of the bale case. The inner surfaces 46, however, of the guide members 45 are tapered uniformly rearwardly so that the vertical thickness of the guides at the forward end of the plunger is greater than the thickness at the rear end of the plunger head. Accordingly, the top wall portion 19 of each of the side walls 18 is inclined upwardly and rearwardly to correspond to the taper of the guide members, and similarly, the lower walls 21 are inclined downwardly and rearwardly, with the result that the guide members 45 lie flat against the top and bottom walls 19, 21, respectively, while the outer surfaces are parallel to the top and bottom walls 7, 8 of the bale case, regardless of the fore and aft position of the guide members 45 relative to the metal frame 15, and by sliding the guide members rearwardly relative to the inclined supporting surfaces of the walls 19, 21, the outer surfaces of the guide members are brought into sliding contact with the top and bottom walls 7, 8, respectively. Thus, after a certain amount of wear has occurred during operation of the baling press, the plunger will become loose in the bale case but this looseness can be taken up by shifting the guide members 45 rearwardly relative to the plunger head frame 15.

Wear also occurs between the side edges of the guide members 45 and the side walls 9, 10, respectively, and this wear is similarly compensated for, simultaneously with the adjustment for wear on the horizontal surfaces of the guides, as will best be understood by inspection of Figure 1. Each of the guide members 45 tapers to provide rearwardly converging lateral sides, the outer sides of the guide members being normally flat against the side walls 9, 10, while the inner sides of the guide members are inclined outwardly and rearwardly from the forward ends of the members 45. The inclined inner edges of the guide members 45 bear against the vertical flanges 20 and 22 which are inclined at an acute angle to the side walls 9, 10, respectively, converging rearwardly with the latter. Thus, by shifting the guide members 45 rearwardly in contact with the flanges 20 and 22, the guide members move outwardly with their outer edges parallel to the side walls 9, 10, until the outer edges of the guide members lie flat against the side walls of the bale case.

Thus, it is evident that when the guide members 45 are shifted rearwardly to compensate for wear on the top and bottom surfaces of the latter, they also compensate for wear along the side edges thereof. In other words, the guide members, when shifted rearwardly, move toward both the intersecting walls of the bale case which define the corner associated therewith, respectively. It is noted that each of the longitudinally extending corners of the plunger head can be said to have a longitudinal recess formed therein by the top and bottom walls 19, 21 and the vertical flanges 20, 22, in which recesses the wooden guide members 45 are received.

The guide members 45 are secured in adjusted position by means of a plurality of carriage bolts 50, extending vertically through apertures 51 in the guide members 45 and through longitudinally extending slots 52 in the top and bottom walls 19, 21, respectively. The heads of the bolts 50 are set into recesses 53 in the guide members 45 and the bolts are secured by nuts 54 and washers 55 engaging the threaded ends of the bolts 50 beneath the slots 52 in the top and bottom walls 19, 21. As shown in Figure 1, there are preferably three bolts in each of the guide members 45, and each of the slots 52 is disposed substantially parallel to the vertical inclined flanges 20, 22. Thus, there are twelve bolts 50 in the plunger head. Access to the nuts 54 can be had through the rear of the plunger head, and through the hollow structural frame 15.

After wear has occurred in the guide strips 45, the latter can easily be adjusted by loosening the twelve nuts 54 and sliding the guide members 45 rearwardly until a sliding fit is again obtained. Of course, the upper and lower guide members 45 on the side opposite the feed opening 11 must be adjusted to properly bring the knife 35 into cutting relation with the stationary cutting edge 39. The nuts 54 are then tightened securely to hold the guide members 45 in adjusted position.

A pair of hard wood bearing blocks 56 are rigidly bolted to the upper and lower longitudinal frame members 24 by bolts 57. These blocks 56 are more in the nature of spacers than of wearing members, and are not provided with adjusting means to compensate for wear. If desired, a vertical spacer block 58 can be bolted to the side 18 of the plunger head opposite the knife 35 between the upper and lower guide members 45. This spacer is rigidly attached by suitable bolts or the like and is not provided with adjusting means.

We claim:

1. A baling press plunger head comprising a generally rectangular frame including means defining a recess extending longitudinally along at least one corner thereof, a guide member disposed longitudinally in said recess and adapted to slidably bear against a pair of perpendicular intersecting walls forming a corner of a bale case, said guide member being tapered to provide converging sides and said recess having a correspondingly inclined surface to position the outer surfaces of said guide member parallel to said intersecting bale case walls, said guide member being shiftable longitudinally of said inclined surface in said recess to shift one of said outer surfaces outwardly to compensate for wear, and means for securing said guide member rigidly to said frame in adjusted position.

2. A baling press plunger head comprising a generally rectangular frame including means defining a recess extending longitudinally along at least one corner thereof, a guide member disposed longitudinally in said recess and adapted to slidably bear against a pair of perpendicular intersecting walls forming a corner of a bale case, said guide member being tapered to provide converging top and bottom sides and converging lateral sides, said recess having correspondingly inclined surfaces to position the outer surfaces of said guide member parallel to said intersecting bale case walls, said guide member being shiftable longitudinally of said inclined surfaces in said recess to shift both of said outer surfaces outwardly to compensate for wear, and means for securing said guide member rigidly to said frame in adjusted position.

3. A plunger head comprising a generally rectangular frame and guide members extending longitudinally along each corner thereof and adapted to slidably bear against the horizontal and vertical walls of a rectangular bale case, each of said guide members being tapered to provide converging sides and said frame having correspondingly inclined surfaces to position the outer surfaces of said guide members parallel to the associated bale case walls on which they bear, said guide members being shiftable longitudinally relative to said frame to shift certain of said outer surfaces outwardly to compensate for wear, and means for securing said guide members rigidly to said frame in adjusted position.

4. A plunger head comprising a generally rectangular frame and guide members extending longitudinally along each corner thereof and adapted to slidably bear against the horizontal and vertical walls of a rectangular bale case, each of said guide members being tapered to provide converging top and bottom sides and converging lateral sides, said frame having correspondingly inclined surfaces to position the outer surfaces of said guide members parallel to the associated bale case walls on which they bear, said guide members being shiftable longitudinally relative to said frame to shift each of said outer surfaces outwardly to compensate for wear, and means for securing said guide members rigidly to said frame in adjusted position.

MARCUS E. McCLELLAN.
JAMES REX WEST.

REFERENCES CITED

The following references are of record in the file of this patent:

UNITED STATES PATENTS

| Number | Name | Date |
|---|---|---|
| 1,696,974 | Rollman | Jan. 1, 1929 |
| 2,336,351 | Flowers | Dec. 7, 1943 |
| 2,178,322 | Colgin | Oct. 31, 1939 |